(12) United States Patent
Minowa et al.

(10) Patent No.: US 9,057,895 B2
(45) Date of Patent: Jun. 16, 2015

(54) LIQUID CRYSTAL DISPLAY PANEL AND REPAIR METHOD THEREOF

(75) Inventors: Kenichi Minowa, Kumamoto (JP);
Shigeki Watamura, Kumamoto (JP);
Masayuki Yokomizo, Kumamoto (JP);
Hiromasa Morita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 386 days.

(21) Appl. No.: 13/543,870

(22) Filed: Jul. 8, 2012

(65) Prior Publication Data

US 2013/0010242 A1 Jan. 10, 2013

(30) Foreign Application Priority Data

Jul. 7, 2011 (JP) .................................. 2011-150897

(51) Int. Cl.
*G02F 1/1333* (2006.01)
*G02F 1/1339* (2006.01)
*G02F 1/13* (2006.01)
*G02F 1/1362* (2006.01)
*G02F 1/1335* (2006.01)

(52) U.S. Cl.
CPC ........ *G02F 1/1309* (2013.01); *G02F 1/136259* (2013.01); *G02F 1/133509* (2013.01); *G02F 1/133512* (2013.01); *G02F 1/133516* (2013.01)

(58) Field of Classification Search
CPC ............ G02F 1/1309; G02F 1/136259; G02F 2001/506; G02F 2001/508; G02F 1/133512; G02F 1/133514
See application file for complete search history.

(56) References Cited

U.S. PATENT DOCUMENTS

| 5,880,799 A * | 3/1999 | Inoue et al. ................... 349/110 |
| 2006/0041053 A1* | 2/2006 | Kamata et al. ................. 524/556 |
| 2007/0200492 A1* | 8/2007 | Cok et al. ...................... 313/506 |
| 2009/0141231 A1* | 6/2009 | Lim et al. ...................... 349/192 |
| 2009/0190075 A1* | 7/2009 | Kim ............................... 349/106 |
| 2010/0238386 A1* | 9/2010 | Yin et al. ....................... 349/106 |
| 2012/0002155 A1* | 1/2012 | Lin et al. ....................... 349/192 |

FOREIGN PATENT DOCUMENTS

| JP | 04-361228 A | 12/1992 |
| JP | 2011-504599 A | 2/2011 |
| WO | 2008/156280 A1 | 12/2008 |
| WO | 2008/156286 A1 | 12/2008 |

\* cited by examiner

*Primary Examiner* — Bumsuk Won
*Assistant Examiner* — Ryan Crockett
(74) *Attorney, Agent, or Firm* — Studebaker & Brackett PC

(57) ABSTRACT

A liquid crystal display panel includes: a liquid crystal; a pixel electrode, which applies a voltage to the liquid crystal; a switching device, which applies a voltage to the pixel electrode; a light shield part, which covers an area except for the pixel electrode, and which has an opening facing the pixel electrode; a color material, which is formed to overlap with a whole area of the opening; an inclusion part, which is a part of the light shield part and is adjacent to the color material; a black powder inclusion space, which is covered by the inclusion part; and a black powder, which is included in the black powder inclusion pocket.

9 Claims, 4 Drawing Sheets

LIQUID CRYSTAL DISPLAY PANEL AND REPAIR METHOD THEREOF

CROSS-REFERENCE TO RELATED APPLICATION

This application claims priority from Japanese Patent Application No. 2011-150897 filed on Jul. 7, 2011, the entire subject matter of which is incorporated herein by reference.

TECHNICAL FIELD

This disclosure relates to a liquid crystal display panel, which is used an active matrix liquid crystal display apparatus driven by a switching device formed on a transparent substrate.

BACKGROUND

In recent years, according to its light, thin, low power consumption properties, an Flat Panel Display (FPD), such as liquid crystal display panel, has been widely used in a variety of fields, for examples a television, a car navigation and a compute. A panel size is being increased every year and a demand for a zero-defect of pixels is required, so that a repair method of a defect part is required to improve the productivity in the manufacturing. The liquid crystal display panel has a pair of substrates facing each other, a gap between the substrates is kept constant by a spacer and a liquid crystal fill up between the substrates. One substrate is an active matrix array substrate, on which thin film transistors (hereinafter, referred to as TFTs) and pixel electrodes to be connected to the TFTs is formed. The other substrate facing the array substrate is usually provided with a color filter (hereinafter, referred to as CF). The substrate having the CF formed thereon is also referred to as color filter substrate (CF substrate).

A conductive film is respectively formed on each substrate. A driving of the liquid crystal is controlled by electrical charges that are accumulated between the conductive films. It is difficult to control the liquid crystal near a transistor formation part or wiring part of the TFT, compared to the liquid crystal in a display part configuring the pixels. Accordingly, a light shield area (hereinafter, referred to as BM) is formed on the CF side to suppress light transmission, so that a beautiful display is made.

The array substrate has a plurality of independent pixels. However, in any one during the TFT manufacturing process, if an abnormal pattern is caused or a foreign material or impurity is introduced between the array substrate and the opposite substrate (CF substrate), the pixel is to be a luminescent point defect that the pixel is brighter than the surrounding, so that a quality is degraded. Even though one of millions of pixels has the luminescent point defect, it may be considered as a defective product, because a market demand for a high-quality liquid crystal panel having no luminescent point is increased. As countermeasure of the generation of the defect, a repair method becomes more important. That is, it is possible to improve the yield or quality by a relatively simple method of repairing one defect of millions of pixels.

As the method of repairing a pixel having a luminescent point defect that is brighter than the surrounding pixels, a method is known in which the luminescent point defect is turned into a dark point so that the pixel is not more remarkable than the surrounding pixels. The method of turning a luminescent point defect into a dark point (turning-into-dark point) is performed to display the pixel in black all the time. As a repair method of the turning-into-dark point, there is a method of connecting a pixel electrode to a gate by irradiation of laser light and then applying a constant voltage to display the black. This is effective when the pattern defect is caused in the TFT. However, the method has a demerit that it cannot be used for a defect that is caused due to the foreign material introduced to the liquid crystal between the array substrate and the CF substrate, for example. Also, the strength of the connection part, to which the laser light is irradiated, is lower than a normal part. Accordingly, the connection part may be disconnected later, so that the luminescent point defect may be caused again.

Other than the method of electrically controlling the turning-into-dark point, the turning-into-dark point is darkened by coloring of the pixel itself. For example, there is a technology of mixing microcapsules having carbons included therein in a color material of the CF and irradiating the laser to diffuse the carbons in the color material (refer to JP-A-H04-361228) and a technology of scraping a black part of a BM of the CF by irradiating the laser to the BM to diffuse the same into the color material and glass and thus achieving the turning-into-dark point (refer to JP-A-2011-504599).

SUMMARY

However, according to the former method, the carbons are included in the color material, so that the transparency of the liquid crystal display panel is lowered, so that the performance thereof is sacrificed. Also, according to the latter method, the high-performance liquid crystal display panel having a high aperture ratio and the BM part are finely formed, so that it is not possible to secure the BM sufficient for turning a pixel into a dark point. Thus, it is difficult to turn the pixel into a dark point.

In any technology described above, the performance of the liquid crystal display panel is degraded, and the repair may be not perfectly achieved. In view of the above, this disclosure provide at least a repair method, in which the defect part is repaired more securely without lowering performance of a liquid crystal display panel and a yield and a quality is improved.

With taking into consideration the above, a liquid crystal display panel comprises: a liquid crystal; a pixel electrode, which applies a voltage to the liquid crystal; a switching device, which applies a voltage to the pixel electrode; a light shield part, which covers an area except for the pixel electrode, and which has an opening facing the pixel electrode; a color material, which is formed to overlap with a whole area of the opening; an inclusion part, which is a part of the light shield part and is adjacent to the color material; a black powder inclusion pocket, which is covered by the inclusion part; and a black powder, which is included in the black powder inclusion pocket.

Further, a liquid crystal display panel comprises: a liquid crystal; a pixel electrode, which applies a voltage to the liquid crystal; a switching device, which applies a voltage to the pixel electrode; a light shield part, which covers an area except for the pixel electrode and has an opening facing the pixel electrode; a color material, which is formed to overlap with a whole area of the opening; a pillar spacer, which is provided in the light shield part and is adjacent to the color material; a black powder inclusion pocket, which is covered by the pillar spacer; an inclusion part, which seals the black powder inclusion pocket at a top of the pillar spacer; and a black powder, which is included in the black powder inclusion pocket.

According to this disclosure, the black powders required for the turning-into-dark point are included in the pixel surrounding part in a display area of the liquid crystal display panel, and then the laser is irradiated to the black powders adjacent to the pixel having a luminescent point defect, so that the black powders is diffused into the defective pixel. Therefore, it is easily possible to turn the luminescent point defect into a dark point. Also, it is possible to securely perform the repair without lowering the original performance of the liquid crystal display panel.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Illustrative Embodiment

Figure 1:
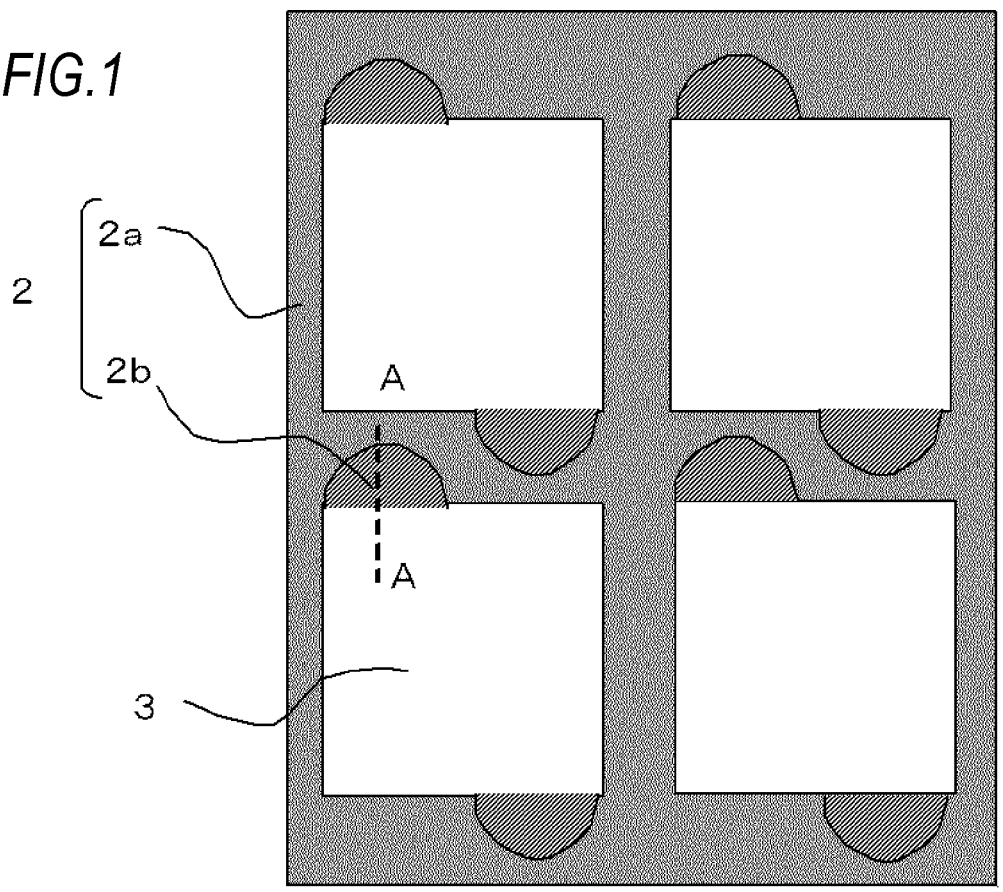
FIG. 1 is a plan view of a color filter of a liquid crystal display panel according to a first illustrative embodiment of this disclosure.
Figure 2:
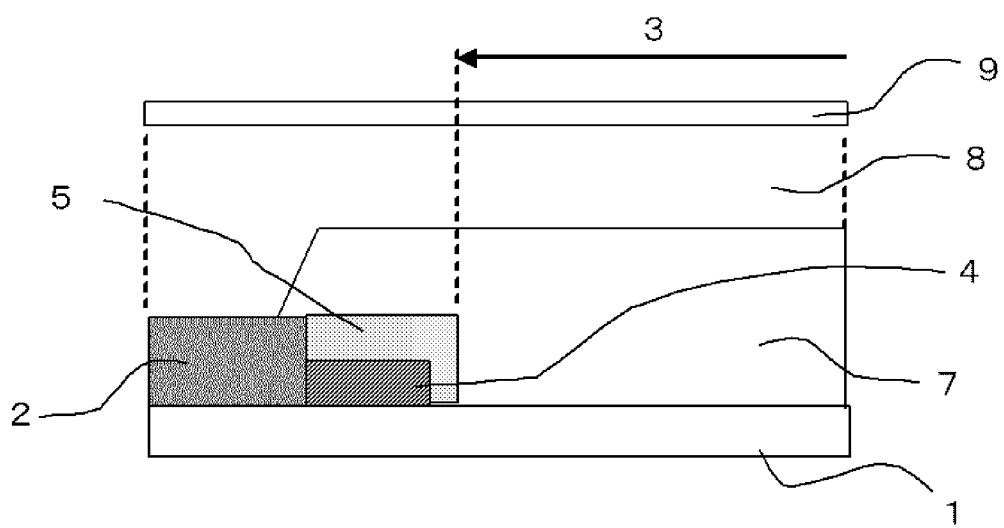
FIG. 2 is a sectional view of the color filter of the liquid crystal display panel according to the first illustrative embodiment of this disclosure.
Figure 3:
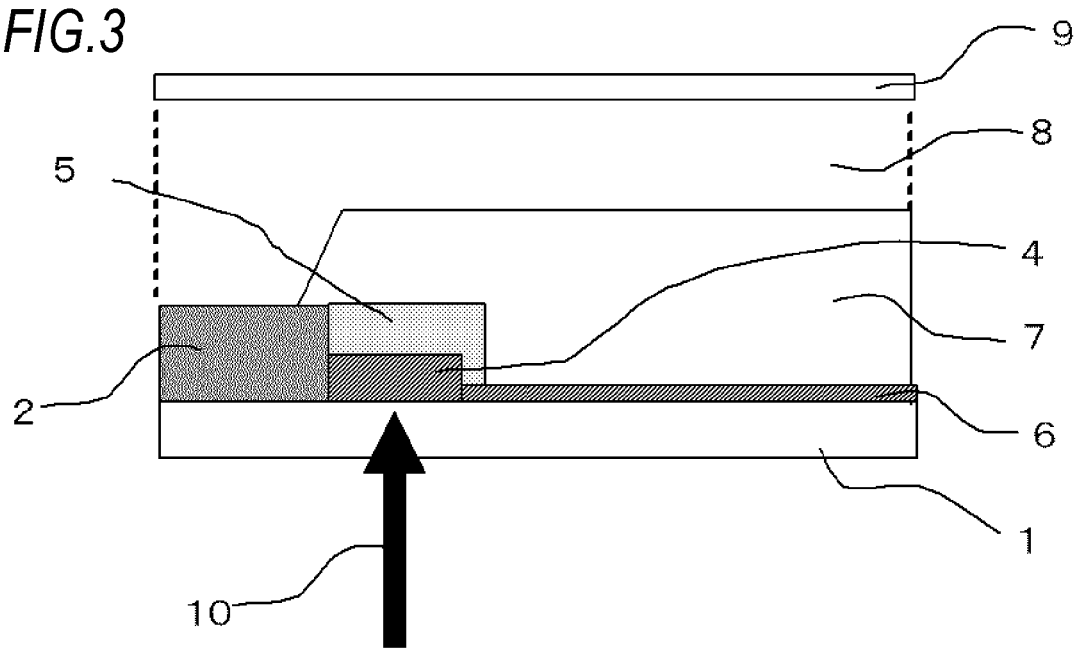
FIG. 3 is a sectional view of the color filter showing a repair method of the liquid crystal display panel according to the first illustrative embodiment of this disclosure.

Hereinafter, illustrative embodiments of this disclosure will be described with reference to the drawings. FIG. 1 is a plan view of a CF substrate according to a first illustrative embodiment of this disclosure. FIG. 2 is a sectional view taken along a line A-A of FIG. 1. FIG. 3 is a sectional view of the CF substrate showing a repair method of a luminescent point defect according to the first illustrative embodiment of this disclosure.

In FIGS. 1 and 2, a light shield part 2 is formed on a glass substrate 1 of a CF substrate. The light shield part 2 is a lattice type and has an opening 3. Here, the opening 3 is corresponding to one pixel (not shown) in a display area. In other words, the opening 3 is corresponding to a pixel electrode (not shown) to which potential is applied by a switching device, such as thin film transistor, on an array substrate. The light shield part 2 has a first light shield part 2a made of a black matrix and a second light shield part 2b having a black powder inclusion pocket 4 and an inclusion material 5.

The second light shield part 2b is formed in an area in which the first light shield part 2a is not formed, and but is formed to be adjacent to at least one opening 3. In FIG. 1, the two second light shields 2b are arranged to be adjacent to the opening 3 with interposing the one opening 3. However, the number and positions of the second light shield parts 2b are not limited thereto. As the number of the second light shield parts per one opening is increased, the effect of the darkening is increased. However, the effect of this disclosure is realized insomuch as one or more second light shield parts are provided. The second light shield parts 2b may not be arranged locally and discretely. For example, the second light shield parts may be formed to surround the opening 3.

As described above, the second light shield part 2b has the black powder inclusion pocket 4 formed on the glass substrate 1, and the inclusion material 5 formed to cover the same. As can be seen from FIG. 2, the inclusion material 5 that is a part of the second light shield part 2b is adjacent to the color material 7. The black powder inclusion pocket 4 is covered by the inclusion material 5 and is not adjacent to the color material 7.

Here, since it is required for the second light shield part 2b to have a light shield function, like the first light shield part 2a, black powders 6 that are included in the black powder inclusion pocket 4 preferably have a low light transparency. Specifically, the black powders such as carbon (graphite) powders and metal oxide powders are preferably used. The inclusion material 5 is to cover the black powders 6 so that the black powders are not leaked to the outside. For the light shield function, the inclusion material 5 preferably has a low light transparency. Specifically, a resin black matrix (resin BM) is used.

The color material 7 is formed to cover the opening 3. The color material 7 corresponds to a color of the color filter. Generally, it is corresponding to one of three colors, i.e., R (Red), G (Green) and B (Blue). In case that the color filter has four or more colors that includes colors other than the RGB, the color material 7 also has a color other than the RGB. When the color filter includes a transparent color, the color material 7 is also optically transparent. In this disclosure, the color material includes such materials.

When there is a gap between the color material 7 and the light shield part 2, the light leaks from the gap. Accordingly, the color material 7 and the light shield part 2 partially overlap each other in the vicinity of the opening 3. That is, the cover material 7 covers not only the opening 3 but also the light shield part 2 adjacent to the opening 3. Here, the color material 7 may completely cover the second light shield part 2b, and an end portion of the area, in which the color material 7 is formed, may be located on the first light shield part 2a. Although it is not required to completely cover the second light shield, such configuration enhances the effect of the darkening, which will be described later.

In FIGS. 1 and 2, a smoothing material 8 (overcoat) made of resin and the like is formed to cover the color material 7 and the light shield part 2, and but the smoothing material 8 may be omitted. Also, a transparent conductive material 9 is formed to cover the smoothing material 8. In the liquid crystal display panel, the transparent conductive material 9 configures common electrodes that face the pixel electrodes on the array substrate, on which the switching devices such as TFTs is formed, with interposing the liquid crystal therebetween. Accordingly, in case that the common electrodes are formed on the array substrate like a horizontal electric field type such as IPS, the transparent conductive material 9 is not formed and only the smoothing material 8 is formed on the color material 7 and the light shield part 2.

In the below, a method of manufacturing the color filter shown in FIGS. 1 and 2 will be described.

A black matrix being the first light shield part 2a is formed on the glass substrate 1. First, a metal film made of such as chromium is formed by a film formation method such as sputtering method or vapor deposition method. Then, the metal film is patterned into a shape of the first light shield part 2a, as shown in FIG. 1, by a photoengraving process.

Then, the black powders 6 are formed on the second light shield part 2b. Specifically, an appropriate amount of the black powders is dropped on the second light shield part 2b from a fine nozzle, so that the black powder pocket 4 is formed. Then, an appropriate amount of the resin BM and the like is dropped from the above of the black powder pocket 4 by the fine nozzle, and the resin BM is cured by a method such as UV curing or thermal curing, so that the inclusion material 5 including the black powders is formed.

Also, the color material 7 is formed by a coating-patterning method or a mask deposition method. At this time, the color material 7 in the pixel surrounding part is formed to overlap with the light shield part 2. Also, the color material 7 is formed to cover the inclusion material 5 of the second light shield part 2b. Then, the smoothing material 8 is coated. Then, the transparent conductive material 9 is formed as a film by the sputtering or deposition method, and the film is appropriately patterned.

Then, a repair method for turning a luminescent point defect, which is caused in a pixel corresponding to the color filter shown in FIGS. 1 and 2, into a dark point defect is described with reference to FIG. 3. FIG. 3 is a sectional view of the CF substrate after laser irradiation. The laser 10 is irradiated to the glass substrate 1 of the CF to break the inclusion material 5 and to diffuse the black powders 6 into the gap between the color material 7 and the glass substrate 1 in the opening 3, so that an area corresponding to the opening 3 of the CF substrate is darkened.

Here, if the color material 7 does not cover the inclusion material 5, the black powders 6 diffuse to an area other than the opening 4, such as the first light shield part 2a, so that a darkening is not sufficiently achieved. In the first illustrative embodiment, since the color material 7 covers the inclusion material 5, the black powders 6 are diffused to the gap between the color material 7 and the glass substrate 1 in the opening 7, so that the darkening of the pixel is achieved. A wavelength of the laser may be appropriately determined. In general, the wavelength of 1064 nm, 532 nm, 355 nm, 266 nm and the like is used.

Meanwhile, in the first illustrative embodiment, it is exemplified that the color filter faces the array substrate having the switching devices such as TFTs with sandwiching the liquid crystal therebetween. However, this disclosure is not limited thereto. This disclosure can be also applied to a liquid crystal panel referred to as a CF-on-array, in which the color filter is formed on the array substrate. In this case, it is possible to achieve the same effect by providing the black powder inclusion part to the light shield part surrounding the color filter formed on the array substrate.

Additionally, although the first light shield part and the second light shield part are formed at the same layer, they may be formed at different layers. In this case, the first light shield part and the second light shield part may partially overlap each other so as to increase the light shield effect.

Second Illustrative Embodiment

In the first illustrative embodiment, the luminescent point defect is turned into the dark point by the black powders. However, in a panel having a large pixel or a panel having a high aperture ratio, a space for accommodating the black powders to sufficiently turn the whole pixel into a dark point may not be secured. In a second illustrative embodiment, the laser is irradiated to a central portion of the opening of the CF substrate, so that the CF is directly darken, in addition to the repair method of the first illustrative embodiment.

When there is not a space for accommodating the black powders enough to darken the whole pixel, even though the black powders are diffused into the opening by the laser irradiation, the black powders may not completely reach the central portion of the opening. In this case, the pixel surrounding part of the liquid crystal display panel is resultantly blackened. However, only a central portion of the pixel cannot be sufficiently darkened. Meanwhile, in the method of directly darkening the color material of the CF by the laser irradiation, when the laser is irradiated to the pixel surrounding part, an orientation abnormality area is generated in a surrounding part thereof. However, when the laser irradiation area is limited to the central portion of the pixel, the above problem is considerably reduced.

In the second illustrative embodiment, in case of a panel having a small space for accommodating the black powders, the darkening method of the first illustrative embodiment and the method of directly darkening the CF by the laser are combined to compensate the demerits of both methods. Therefore, it is possible to sufficiently darken the whole surface including not only the central portion of the pixel but also the surrounding part thereof.

Figure 4:
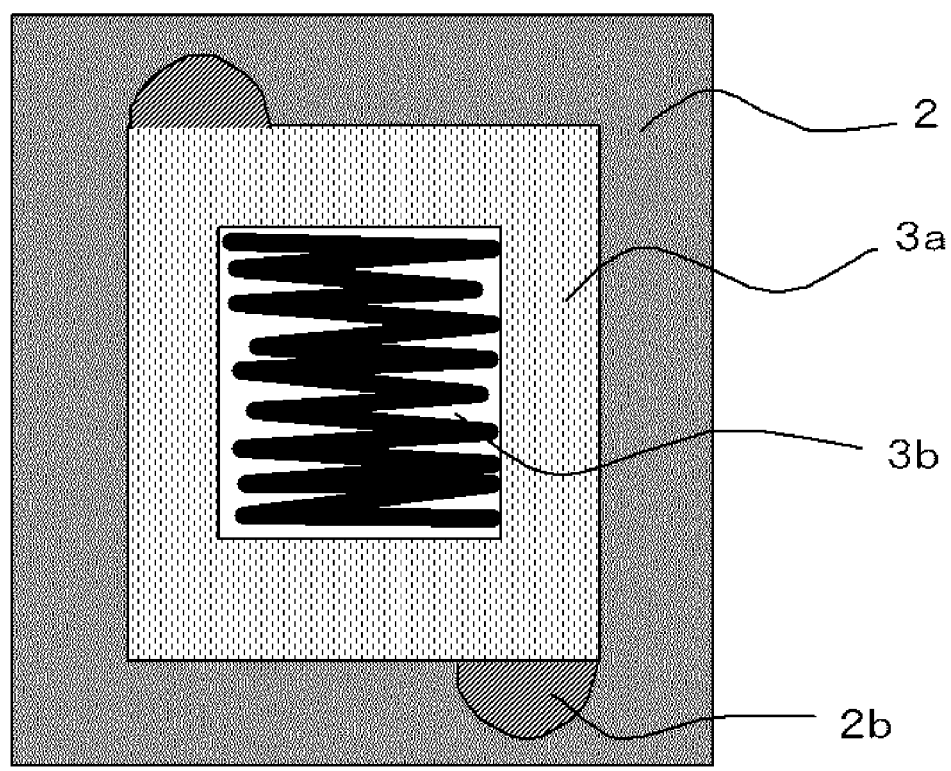
FIG. 4 is a plan view of a color filter showing a repair method of a liquid crystal display panel according to a second illustrative embodiment of this disclosure.

The repair method of the second illustrative embodiment is described with reference to FIG. 4. First, the laser 10 is irradiated to a central portion 3b of the opening from the CF or TFT glass surface side, so that the color material 7, an organic film and the like in the central portion 3b of the opening is carbonized and thus the light transparency thereof is lowered. That is, the pixel is turned into a dark point. Additionally, the laser 10 is not to be irradiated to a pixel surrounding part 3a in this process.

Then, the laser 10 is irradiated to the black powder pocket 4, which is provided in the second light shield part 2b of the pixel surrounding part 3a, from the glass substrate 1 of the CF substrate, to break the inclusion material 5. As a result, the black powders 6 are diffused to the gap between the color material 7 and the glass substrate 1, so that the surrounding part 3a of the opening of the CF substrate is darkened.

Incidentally, one of the process of directly irradiating the laser 10 to the CF substrate 10 and thus darkening the CF and the process of the diffusing the black powders by the laser irradiation may performed in advance to the other process, and both processes may be carried out at the same time. For example, a laser irradiation apparatus, which separately includes both a system for irradiating laser to the central portion 3b of the opening of the CF substrate and a system for irradiating laser to the black powders 6, may be applied. Here, the systems may have a plurality of different laser devices and may have the laser irradiation process based on the time-dividing process. The parameters such as power, wavelength and pulse width of optimum laser may be changed depending on the irradiation areas. Alternatively, a size of a pixel, a gap with a neighboring pixel and a size of a black matrix is previously set or is reading out with an image recognition method, so that the irradiation area may be set before the laser irradiation.

Also, the area of lowering the light transparency of the color material 7 and the area to be darkened by the diffusion of the black powders 6 may partially overlap each other in the opening 3. By combining these configurations, it is possible to further improve the controllability of the turning-into-dark point and to increase the productivity.

Third Illustrative Embodiment

In the first illustrative embodiment, the black powders are arranged in the light shield part. In a third illustrative embodiment, the black powders are included in a pillar space for controlling an gap between the array substrate and the opposite substrate, and the black powders are diffused into the pixel by the laser irradiation. The structure and method thereof are described with reference to FIGS. 5 to 7.

Figure 5:
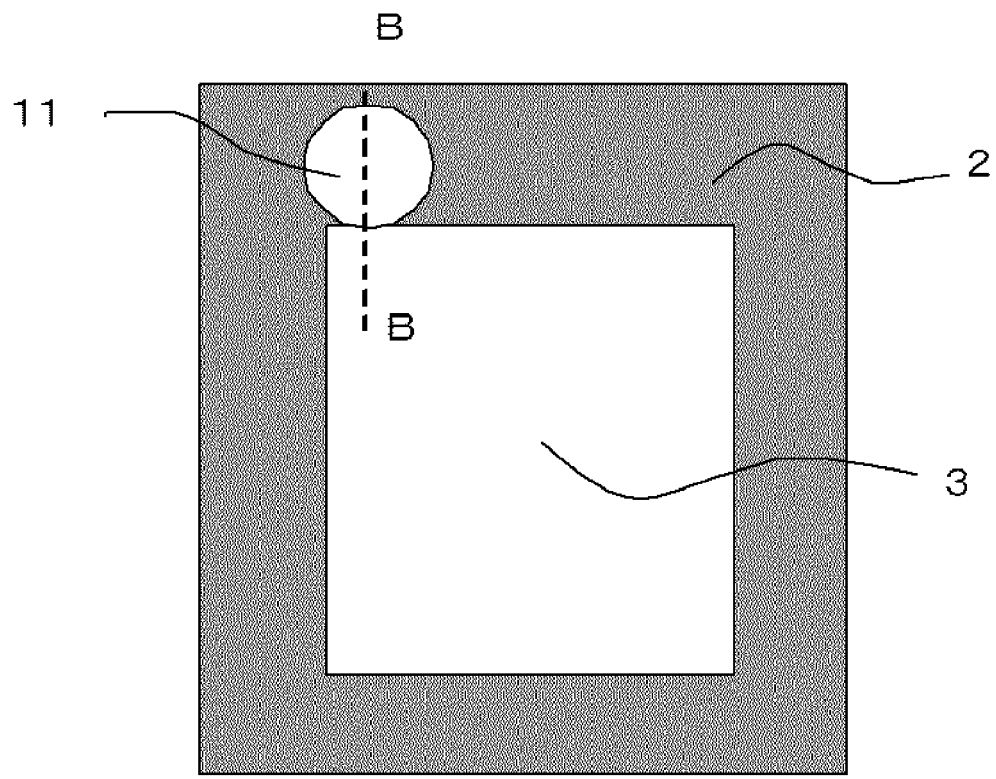
FIG. 5 is a plan view of a color filter of a liquid crystal display panel according to a third illustrative embodiment of this disclosure.
Figure 6:
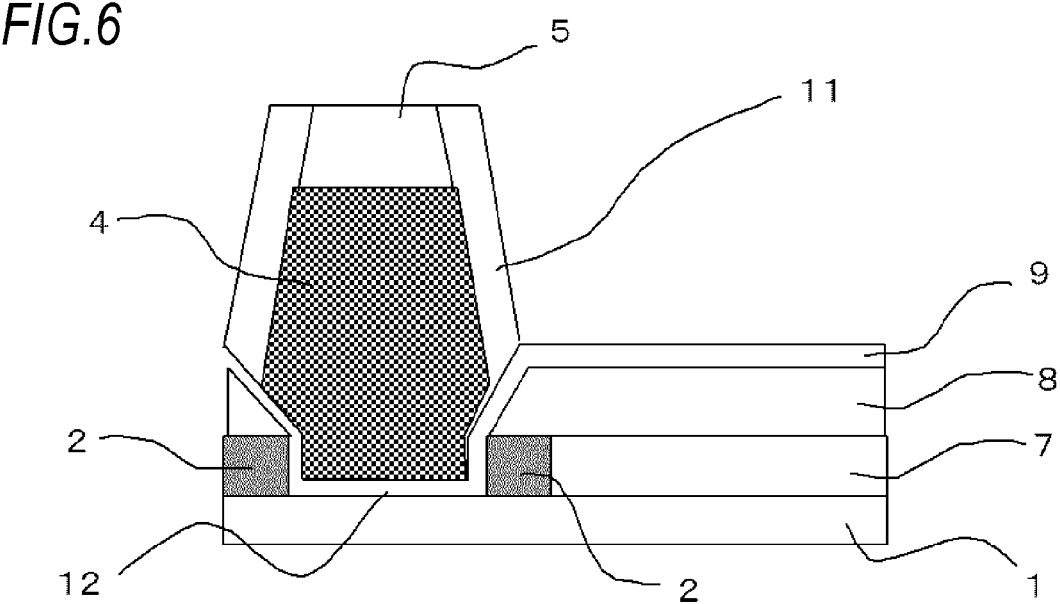
FIG. 6 is a sectional view of the color filter of the liquid crystal display panel according to the third illustrative embodiment of this disclosure.

FIG. 5 is a plan view of a liquid crystal display panel according to the third illustrative embodiment and FIG. 6 is a sectional view taken along a line B-B of FIG. 5. In FIG. 5, a pillar spacer 11 is formed to be adjacent to the color material 7 that is formed to overlap the whole area of the opening 3 surrounded by the light shield part 2. Here, in general, the pillar spacer 11 is formed to keep a cell gap with a constant interval and is provided in the light shield part 2, as shown in FIG. 5.

In FIG. 5, one pillar spacer 11 is formed for each opening. However, the number and position thereof are not limited thereto. That is, one or more pillar spacer may be provided, and the pillar spacer may be provided to any of four sides of a pixel.

In the below, the pillar spacer 11 will be described with reference to FIGS. 5 and 6. In the third illustrative embodiment, specifically, as shown in FIG. 6, the BM (black matrix) 2, the color material 7, the smoothing material 8 made of an organic film and the like are formed on the glass substrate 1. Further, depending on a difference of the liquid crystal driving methods, and the transparent conductive material 9 such as ITO are also formed on the glass substrate 1. An area, in which the pillar spacer 11 of the CF is formed, is located in the light shield part 2. The corresponding position is provided with a depression 12 for the pillar spacer 11 without forming the first light shield part 2a, the color material 7 and the smoothing material 8 made of an organic film and the like. Then, the pillar spacer 11 is provided in the depression 12. In FIG. 6, the pillar spacer 11 is adjacent to the color material 7 without contacting the same. However, the pillar spacer 11 may be directly contacted to the color material 7. Here, the term "adjacent" also includes a configuration where the pillar spacer is directly contacted to the color material.

A central portion of the pillar spacer 11 is hollow, and a hole is formed at the top thereof. The hole corresponds to the black powder pocket 4. Then, an appropriate amount of the black powders is put in the black powder pocket 4, the inclusion material 5 at the top of the pillar spacer 11 includes the black powders 6 and solidify. As the black powders 6, a material having a low light transparency, for example carbon (graphite) powders, metal oxide powders and the like, is used. Also, as the inclusion material 5, the same material as the pillar spacer 11 is used.

Generally, the pillar spacer 11 is formed to keep the cell gap with a constant interval, and the pillar spacer 11 is much thicker (about 2 to 5 μm) than the BM part (about 0.1 μm). Therefore, since it is possible to include the larger amount of the black powders 6 in the pillar spacer 11 than in the light shield part 2, it is possible to sufficiently achieve the turning-into-dark point even in a panel having a large pixel and a high aperture ratio.

Also, in order to enable the large amount of the black powders 6 to be included, the thickness of the black powder pocket 4 may be thicker than the color material.

Figure 7:
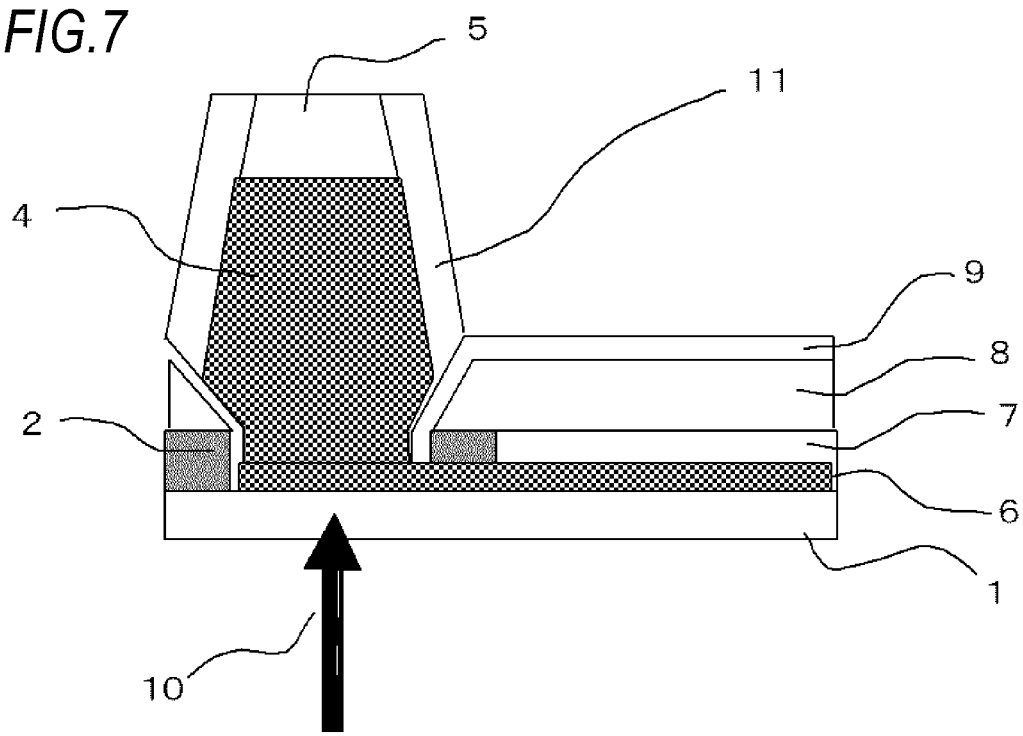
FIG. 7 is a sectional view of the color filter showing a repair method of the liquid crystal display panel according to the third illustrative embodiment of this disclosure.

The repair method of turning the luminescent point defect into the dark point is shown in FIG. 7. The laser 10 is irradiated to the black powder pocket 4 from a backside of the CF substrate, so that the black powders 6 are diffused to the gap between the color material 7 and the substrate 1 in the opening 3, which is the substantially same as the repair method of the first illustrative embodiment. The third illustrative embodiment is different from the first illustrative embodiment, in that the laser 10 does not break the inclusion material 5 and but breaks the transparent conductive material 9 and the first light shield part 2a around the pillar spacer 11. Also, the laser irradiation condition should be also appropriately adjusted.

Meanwhile, in this illustrative embodiment, it has been described that the laser is irradiated to the black matrix on the color filter substrate. However, this disclosure is not limited thereto.

For example, the color filter or black matrix may be arranged on the array substrate. This disclosure can be also applied to an IPS or FFS, in which the opposite electrodes are formed on the array substrate and not the opposite substrate. In this case, the color material 7 is not necessarily formed on the glass substrate 1. For example, the color material 7 may be formed at the same layer as the TFT or pixel electrode on the array substrate, and the color material 7 may be formed on an insulation film covering the TFT or pixel electrode. The light shield part having the opening 3 corresponding to the color material 7 may be also appropriately formed on the array substrate.

In particular, since the array substrate has the larger number of layers than that of the CF substrate, the second light shield part and the color material may be formed at a different layer from the first light shield part. For example, when it is necessary to consider a capacitance between the light shield part and the pixel electrode on the array substrate, the number of the insulation layers between the first light shield part and the pixel electrode may be made larger than the number of the insulation layers between the second light shield part and the pixel electrode.

Also, in this disclose, the pixel electrode allowing the light to penetrate therethrough has been described. However, this disclosure can be also applied to a reflective liquid crystal display apparatus, in which pixel electrodes reflecting the light are arranged to use the outside light. Also, this disclosure can be applied to a translucent liquid crystal display apparatus having reflective pixel electrodes and transmissive pixel electrodes.

Also, the method of this disclosure can be applied to a monochrome display apparatus having no color filter, insomuch as the black matrix and the gap to which the black powders are diffused are provided. In this case, the color material is made of optically transparent resin and the like. That is, since this disclosure enable the darkening, the color material includes a transparent material.

These illustrative embodiments can be appropriately combined. For example, the second and third illustrative embodiments can be combined.

What is claimed is:

1. A liquid crystal display panel comprising:
   a liquid crystal;
   a pixel electrode, which applies a voltage to the liquid crystal;
   a switching device, which applies a voltage to the pixel electrode;
   a light shield part, which covers an area except for the pixel electrode, and which has an opening facing the pixel electrode;
   a color material, which is formed to overlap with a whole area of the opening;
   an inclusion part, which is a part of the light shield part and is adjacent to the color material; wherein the inclusion part is made from a material that includes a resin matrix;
   a black powder inclusion space, which is covered by the inclusion part; and
   a black powder, which is included in the black powder inclusion space.

2. The liquid crystal display panel of claim 1, wherein the black powder inclusion space is not directly adjacent to the color material.

3. A liquid crystal display panel comprising:
a liquid crystal;
a pixel electrode, which applies a voltage to the liquid crystal;
a switching device, which applies a voltage to the pixel electrode;
a light shield part, which covers an area except for the pixel electrode and has an opening facing the pixel electrode;
a color material, which is formed to overlap with a whole area of the opening;
a pillar spacer, which is provided in the light shield part and is adjacent to the color material;
a black powder inclusion space, which is covered by the pillar spacer;
an inclusion part, which seals the black powder inclusion space at a top of the pillar spacer; wherein the inclusion part is made from a material that includes a resin matrix;
and a black powder, which is included in the black powder inclusion space.

4. The liquid crystal display panel according to claim 3, wherein the black powder inclusion space is thicker than the color material.

5. The liquid crystal display panel of claim 3, wherein the black powder inclusion space is not directly adjacent to the color material.

6. A method of repairing a liquid crystal display panel that comprises:
a liquid crystal;
a pixel electrode, which applies a voltage to the liquid crystal;
a switching device, which applies a voltage to the pixel electrode;
a light shield part, which covers an area except for the pixel electrode, and which has an opening facing the pixel electrode;
a color material, which is formed to overlap with a whole area of the opening;
an inclusion part, which is a part of the light shield part and is adjacent to the color material, wherein the inclusion part is made from a material that includes a resin matrix;
a black powder inclusion space, which is covered by the inclusion part; and
a black powder, which is included in the black powder inclusion space, the method comprising:
irradiating laser light to the black powder inclusion space so that the black powders is diffused from the light shield part to the opening.

7. The repair method according to claim 6, further comprising:
irradiating the laser light to the color material in an area corresponding to a central portion of the opening so that a light transparency of the color material is to be lowered.

8. The repair method according to claim 6, wherein a pillar spacer adjacent to the color material in the light shield part is provided, and wherein the pillar spacer has the black powder inclusion space.

9. The repair method according to claim 6, wherein the black powder inclusion space is not directly adjacent to the color material.

* * * * *